United States Patent
Bach et al.

(10) Patent No.: US 9,182,296 B2
(45) Date of Patent: Nov. 10, 2015

(54) OVEN AIR SAMPLING SYSTEM

(75) Inventors: James Carter Bach, Seymour, IN (US); Eric Scott Johnson, Louisville, KY (US)

(73) Assignee: General Electric Company, Schenectady, NY (US)

( * ) Notice: Subject to any disclaimer, the term of this patent is extended or adjusted under 35 U.S.C. 154(b) by 810 days.

(21) Appl. No.: 13/472,968

(22) Filed: May 16, 2012

(65) Prior Publication Data
US 2013/0308678 A1 Nov. 21, 2013

(51) Int. Cl.
| | |
|---|---|
| F24C 15/32 | (2006.01) |
| G01K 13/02 | (2006.01) |
| A21B 1/26 | (2006.01) |
| A21B 1/24 | (2006.01) |
| A21B 1/40 | (2006.01) |
| F24C 7/08 | (2006.01) |

(52) U.S. Cl.
CPC . *G01K 13/02* (2013.01); *A21B 1/24* (2013.01); *A21B 1/245* (2013.01); *A21B 1/26* (2013.01); *A21B 1/40* (2013.01); *F24C 7/087* (2013.01); *F24C 7/088* (2013.01); *G01K 2013/024* (2013.01); *G01K 2207/06* (2013.01)

(58) Field of Classification Search
CPC ............ A21B 1/245; A21B 1/24; A21B 1/26; A21B 1/40; F24C 7/088; F24C 7/087
USPC .................. 219/399, 400, 494; 374/142, 149; 126/21 A, 21 R
See application file for complete search history.

(56) References Cited

U.S. PATENT DOCUMENTS

| | | | |
|---|---|---|---|
| 3,854,024 A | 12/1974 | Kaufman, Jr. et al. | |
| 4,913,046 A * | 4/1990 | Mothrath et al. | 99/331 |
| 5,286,943 A | 2/1994 | Has | |
| 5,558,793 A | 9/1996 | McKee et al. | |
| 6,316,749 B1 | 11/2001 | Bales et al. | |
| 6,849,840 B2 * | 2/2005 | Sung | 219/757 |
| 7,223,944 B2 | 5/2007 | Kitabayashi et al. | |
| 7,762,250 B2 * | 7/2010 | Elkasevic et al. | 126/198 |
| 7,875,834 B2 * | 1/2011 | Bujeau et al. | 219/401 |
| 8,039,775 B2 * | 10/2011 | Venezia et al. | 219/399 |
| 8,469,017 B2 * | 6/2013 | Berkenkoetter et al. | 126/21 A |
| 8,584,663 B2 * | 11/2013 | Kim et al. | 126/21 A |
| 2007/0163567 A1 * | 7/2007 | Kaneko et al. | 126/21 A |
| 2009/0050130 A1 * | 2/2009 | Kim et al. | 126/21 A |
| 2009/0165770 A1 * | 7/2009 | Berkenkoetter et al. | 126/21 A |

(Continued)

FOREIGN PATENT DOCUMENTS

| | | |
|---|---|---|
| CH | 678672 | 10/1991 |
| DE | 19720736 A1 * | 11/1998 |

(Continued)

*Primary Examiner* — Lisa Caputo
*Assistant Examiner* — Jonathan Dunlap
(74) *Attorney, Agent, or Firm* — Dority & Manning, P.A.

(57) ABSTRACT

A system for the sampling of oven air is described. A duct or channel is provided with air delivered from the interior of the oven cooking chamber. One or more sensors, including one or more temperature sensors, can be placed within the air sampling channel for the purpose of measuring characteristics of the oven cavity's air. The inlet of the air sampling channel can be positioned along a location at or near the vertical center of the oven where e.g., a food being cooked may be located so that the sampled air more accurately reflects the characteristics of the air in the vicinity of the food being cooked.

13 Claims, 6 Drawing Sheets

(56) References Cited

U.S. PATENT DOCUMENTS

2009/0255919 A1\* 10/2009 Venezia et al. ............... 219/399
2010/0282097 A1   11/2010 Schulte
2011/0186030 A1    8/2011 Turek et al.
2013/0333684 A1\* 12/2013 Cescot et al. ............... 126/21 A

FOREIGN PATENT DOCUMENTS

| EP | 0691513 | A3 | * | 9/1996 |
| EP | 0732549 | A2 | * | 5/1997 |
| EP | 0671591 | B1 | * | 2/1999 |

\* cited by examiner

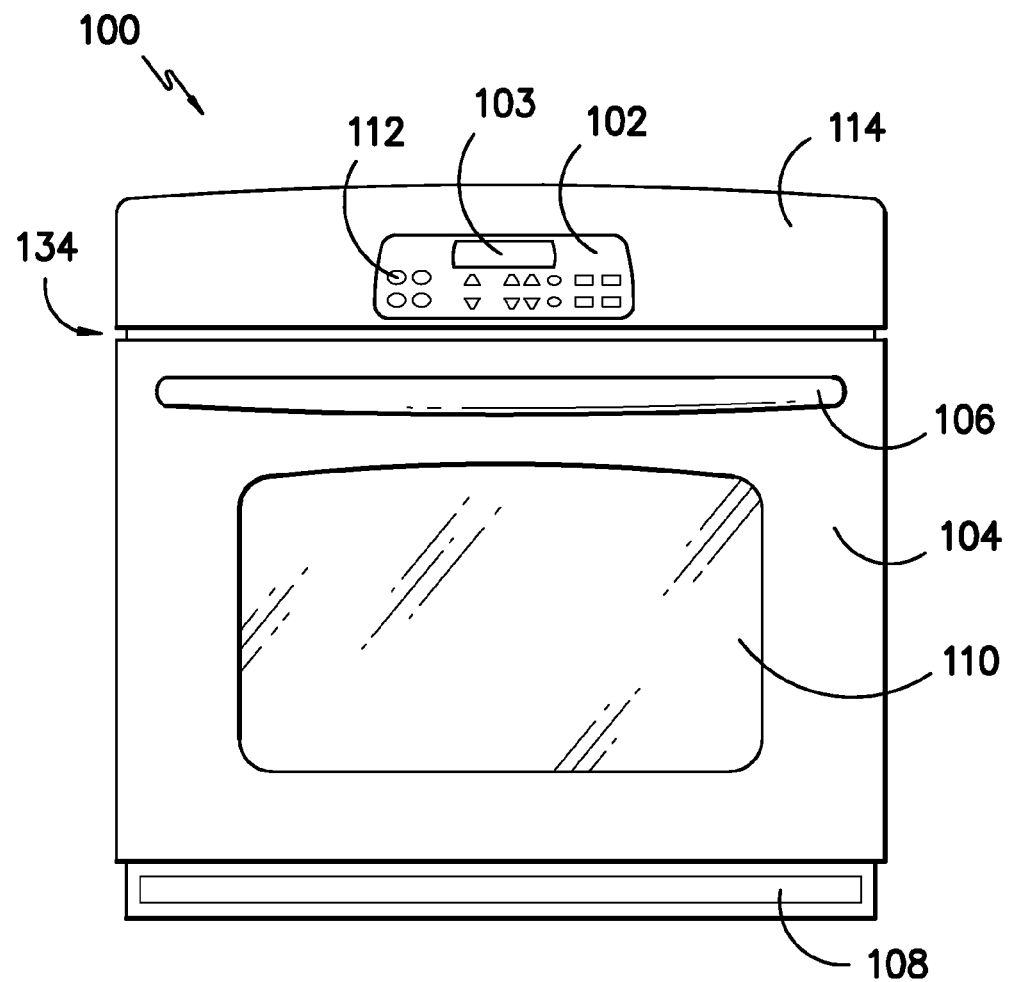
FIG. -1-

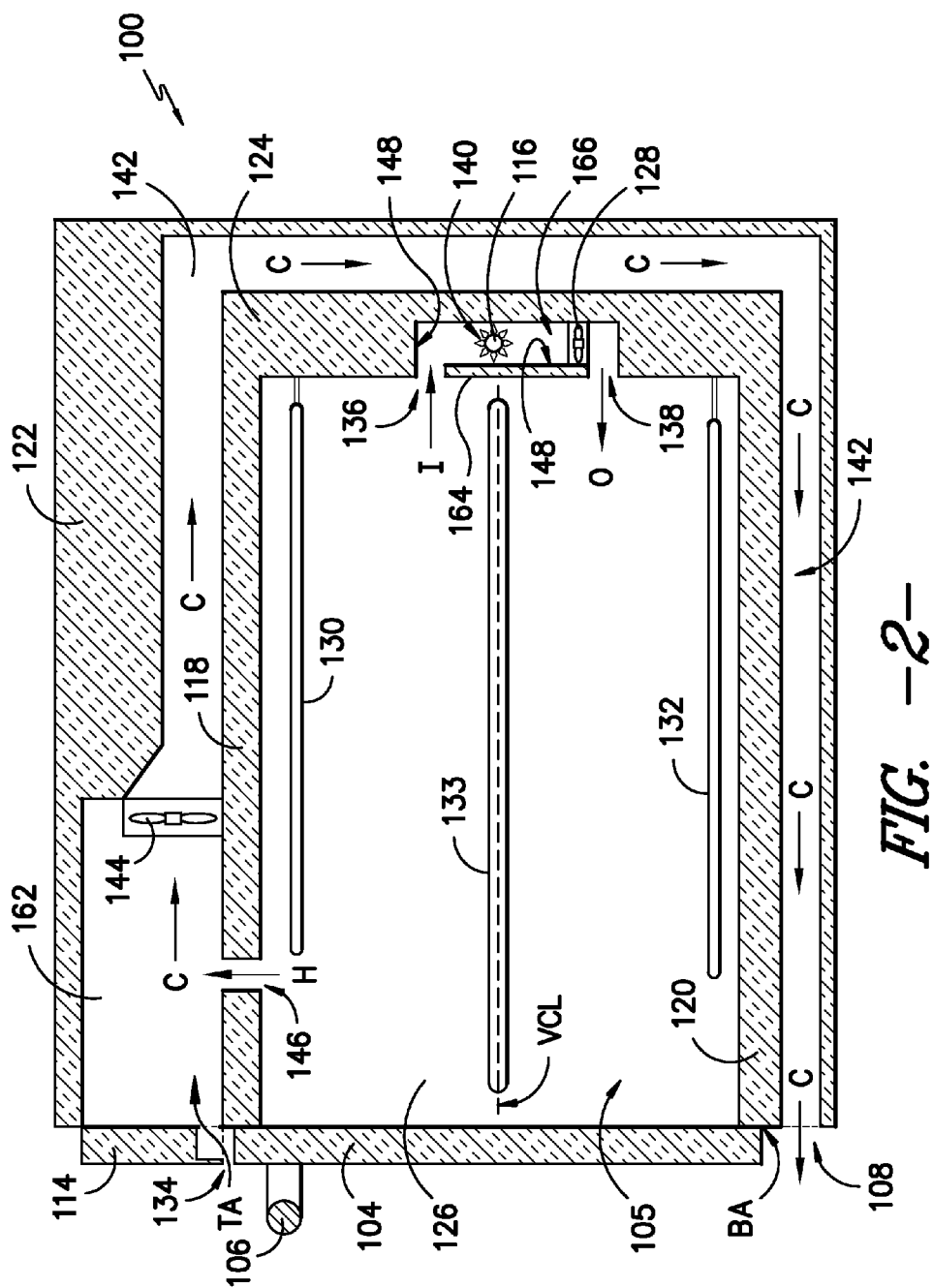
FIG. -2-

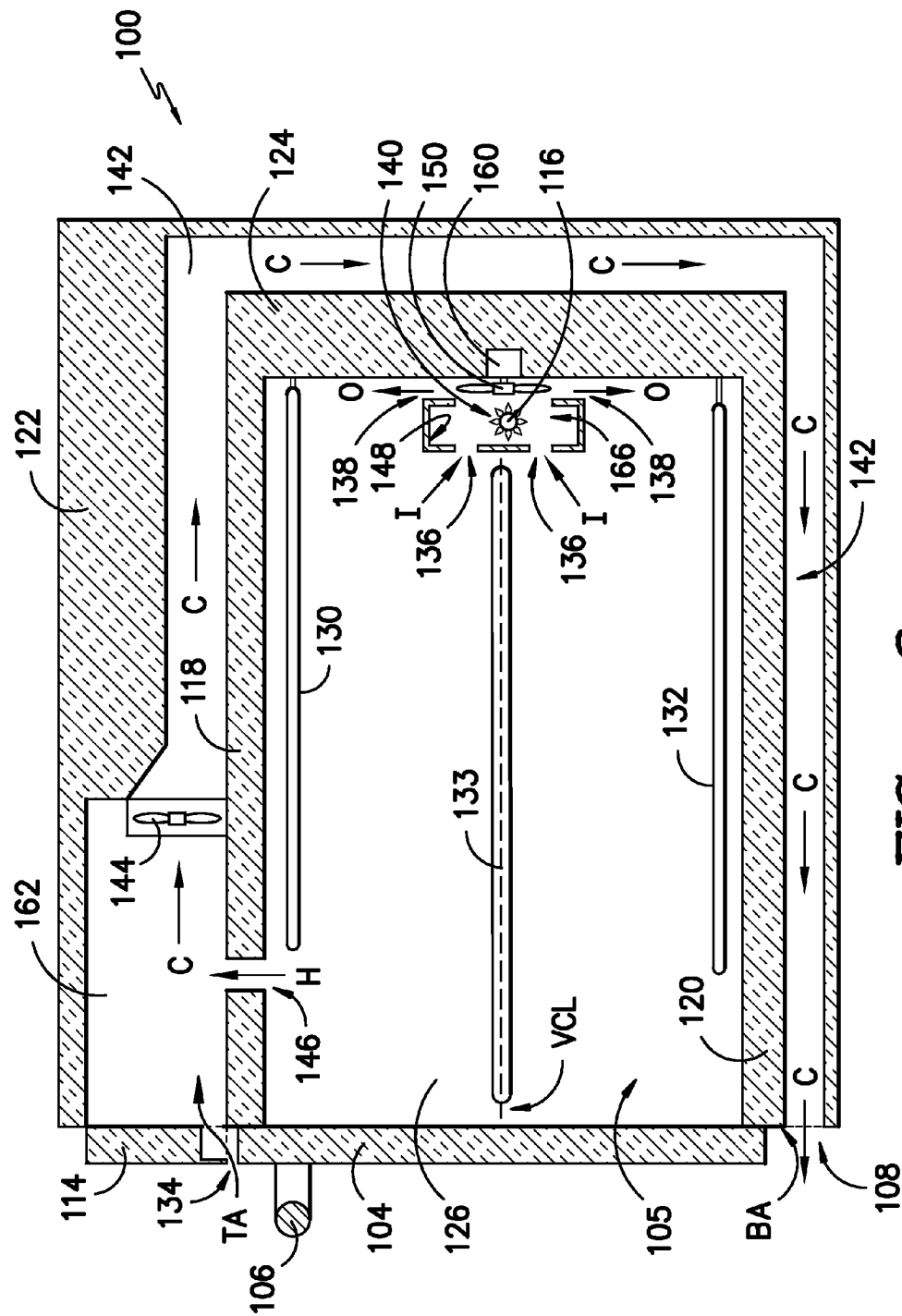
FIG. -3-

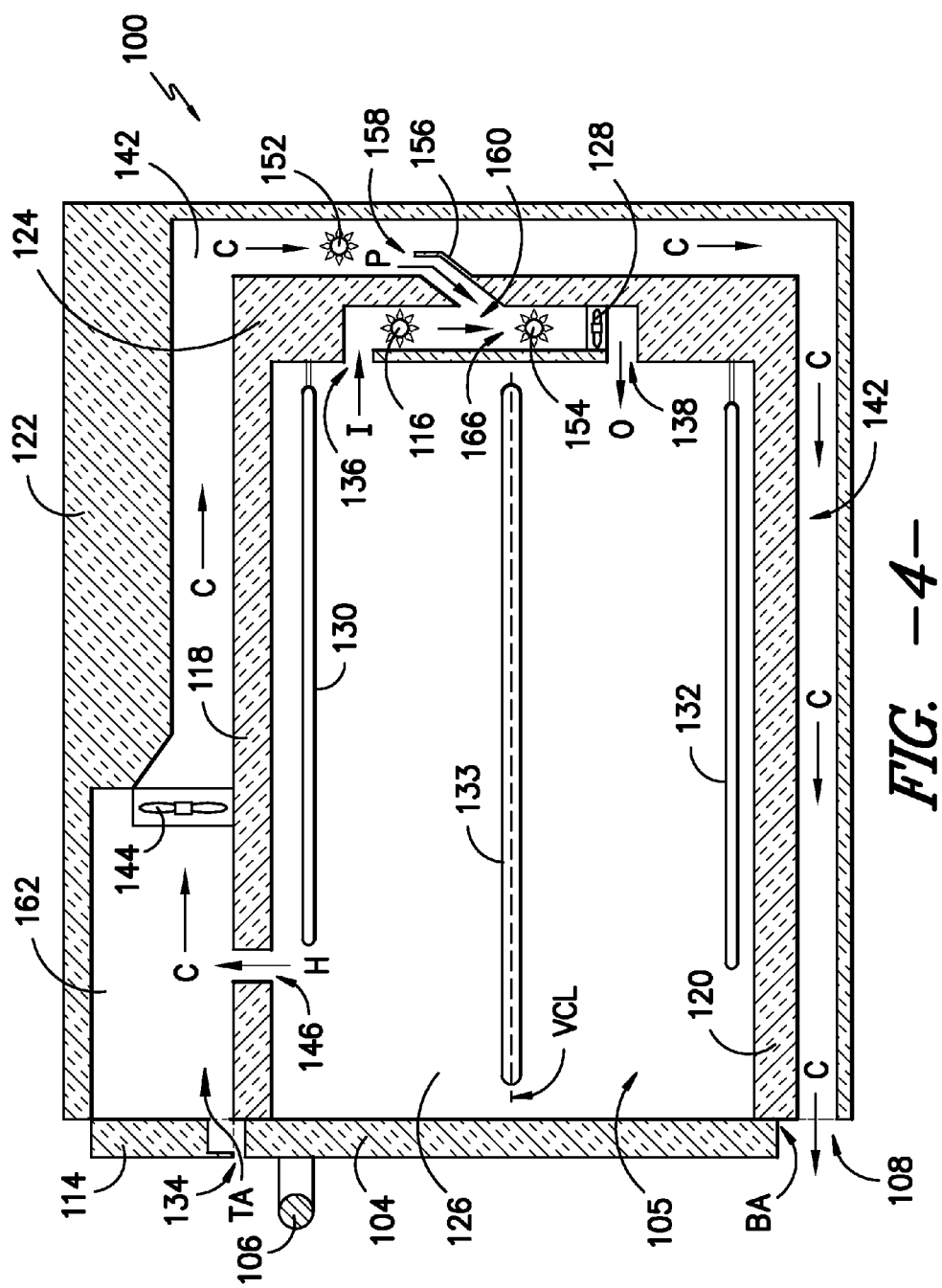
FIG. -4-

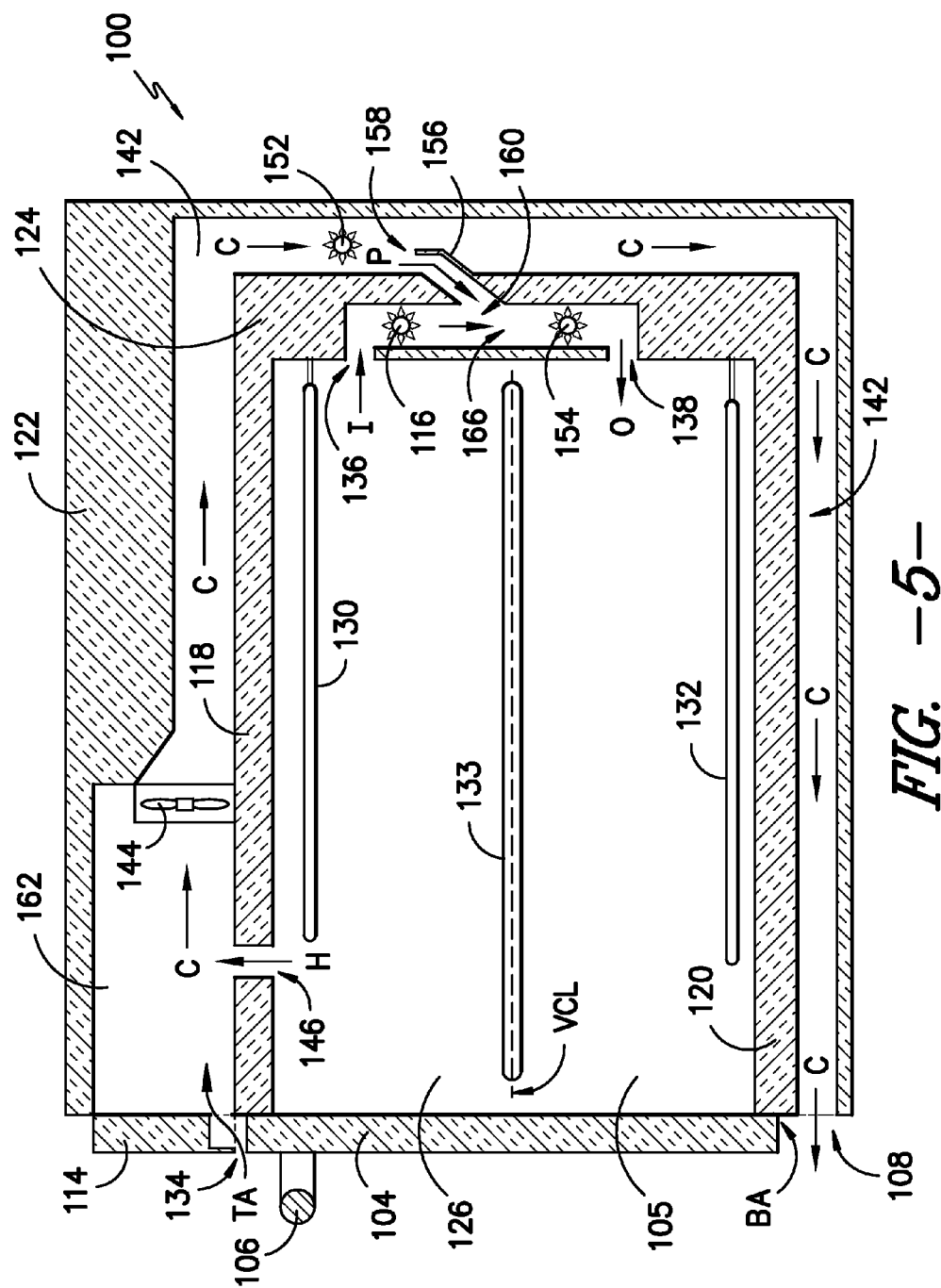
FIG. –5–

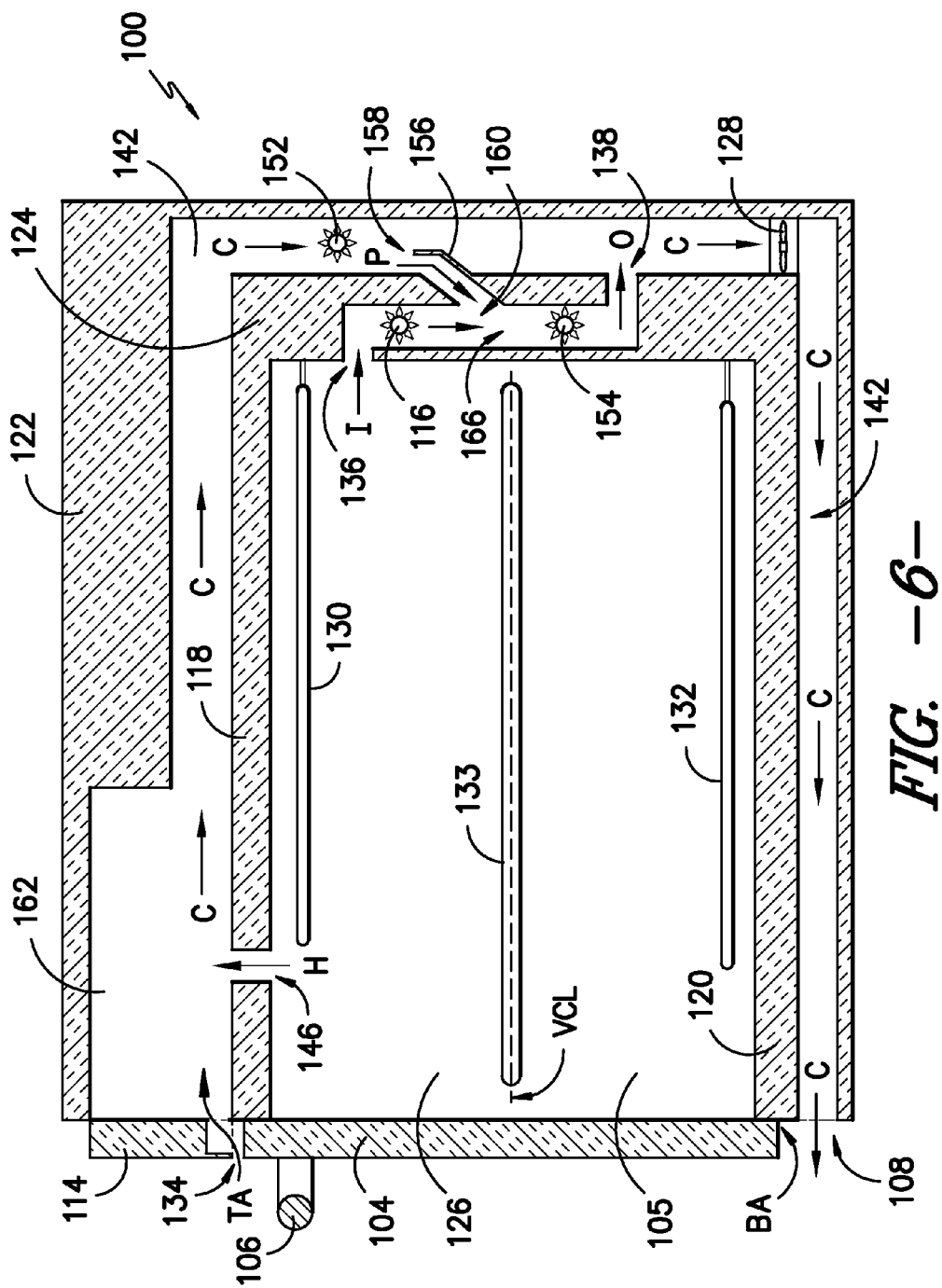
FIG. -6-

OVEN AIR SAMPLING SYSTEM

FIELD OF THE INVENTION

The subject matter of the present disclosure generally relates to oven appliances and, more particularly, to the measurement of the temperature, or other characteristics, of the air inside a cooking chamber of an oven appliance.

BACKGROUND OF THE INVENTION

Modern oven appliances are commonly equipped with a temperature sensor for determining the temperature inside the cooking chamber or oven cavity of the oven appliance. The temperature sensor is typically positioned on the rear wall near the top of the cooking chamber, although other locations have been used. A temperature display may also be provided whereby the user of the oven can monitor the temperature during cooking operations so as to properly cook a food placed into the oven.

The temperature sensor may also be used by e.g., a controller to operate heating elements inside the cooking chamber so as to achieve and then maintain a certain temperature in the cooking chamber according to one or more temperature set-points selected by the user. During cooking operations, the temperature in the cooking chamber can be affected by e.g., opening the oven door, the size and temperature of a food load placed into the oven, and heat losses to the environment. Thus, it is important to accurately measure and monitor the temperature in the cooking chamber throughout the cooking process.

The conventional placement of a temperature sensor at the top of the cooking chamber is problematic for several reasons. During operation of the appliance, a temperature gradient along the vertical direction of the cooking chamber can occur because, due to density differences, air at a higher temperature tends to rise to the top of the cooking chamber while air at a lower temperature tends to fall to the bottom of the cooking chamber. Because food is frequently placed at or near the vertical center of the oven chamber, the temperature of the air near the food can be quite different from the temperature measured by the temperature sensor. The temperature gradient problem can be further exacerbated while cooking in a mode where only a heating element along the top of the oven in close proximity to the temperature sensor is activated. Furthermore, regardless of position, radiant energy provided by one or more heating elements and reflected from the walls of the oven chamber can also adversely affect the accuracy of a temperature sensor placed in the cooking chamber.

It may be desirable to use other types of sensors during cooking operations to measure e.g., the humidity of air in the cooking chamber. However, because of the high temperatures (e.g., up to 500° F. during cooking, and over 800° F. during self-cleaning) that can be encountered in the cooking chamber, the use of such sensors may not be possible or practical. For example, such sensors may not be able to withstand such higher temperatures, direct exposure to IR radiation from the heating elements, or direct exposure to splattered substances e.g. grease or oil. Alternatively, the cost of providing more temperature resistant sensors may be prohibitive.

BRIEF DESCRIPTION OF THE INVENTION

The present invention provides for the measurement of oven cavity air temperature, or other characteristics of the oven cavity air, by using a duct or channel that is provided with air from inside the oven chamber. One or more sensors, including one or more temperatures sensors, can be placed in the channel. The inlet of the channel can be positioned along a location at or near the vertical center of the oven where e.g., a food being cooked may be located so that the measured temperature more accurately reflects the temperature of the air applied to the food. Shielding and/or low emissivity materials can also be used to further minimize the effect of radiant energy on accurate air temperature measurements. Additional aspects and advantages of the invention will be set forth in part in the continuing description herein, or may be apparent from such description, or may be learned through practice of the invention.

In one exemplary embodiment, the present invention provides an oven appliance that includes a cooking chamber for receipt of a food for cooking. The cooking chamber is defined in part by at least one vertically-oriented wall. An oven air sampling channel is provided that includes an oven air inlet for the flow of air from within the cooking chamber into the air sampling channel and an outlet for the flow of air out of the oven air sampling channel. The oven air inlet is positioned along the at least one vertically-oriented wall. A sensor provides for measuring one or more properties of the air flowing through the oven air sampling channel. A fan is configured for causing air to flow from the cooking chamber and through the oven air sampling channel.

In another exemplary embodiment, the present invention provides an oven appliance having a cooking chamber configured for the receipt of food for cooking. The cooking chamber has at least one vertically-oriented wall and defines a vertical center equidistant from both a top wall and a bottom wall of the cooking chamber. A cooling air flow passageway is positioned exterior of the cooking chamber and is configured for providing cooling of the appliance. A cooling fan is in communication with the cooling air flow passageway and is configured for moving an air flow comprising ambient air through the cooling air flow passageway. An oven air sampling channel is provided and includes an oven air inlet for the ingress of air from the cooking chamber into the oven air sampling channel. The oven air inlet is positioned along one of the interior walls of the cooking chamber. A cooling air inlet is provided for ingress of air from the cooling air flow passageway into the oven air sampling channel. An outlet provides for the flow of air out of the oven air sampling channel. An air mixing zone is located within the air sampling channel in fluid communication with the oven air inlet, the cooling air inlet, and the outlet. The air streams from the oven inlet and the cooling air inlet are mixed in the air mixing zone. A first sensor is positioned downstream from the air mixing zone and is configured for measuring one or more properties of air provided from the air mixing zone.

In another exemplary aspect, the present invention provides a method for sampling the interior air of a cooking chamber and reducing its temperature for use with one or more sensors. The method includes the steps of providing a dedicated air sampling channel exterior to a cooking chamber; drawing in air from the cooking chamber into the air sampling channel; drawing in air from a source of cooler air external to the cooking chamber into the air sampling channel; mixing the cooler air and the air from the cooking chamber within the air sampling chamber to provide a mixed air stream; and, immersing a sensor within the mixed air stream.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a front view of an exemplary embodiment of an oven as may be used with the present invention.

FIGS. 2-6 provide cross-sectional views of exemplary embodiments of an oven having a front view such as that shown in FIG. 1.

The use of similar or identical reference numerals in the figures indicates similar or identical features.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a front view of an exemplary embodiment of an oven 100 as may be used with the present invention while FIG. 2 provides a cross-sectional view of an exemplary embodiment of certain internal features as may be used with such oven 100. Oven 100 includes a door 104 with handle 106 that provides for opening and closing access to a cooking chamber 105. A user of the appliance 100 can place a variety of different items to be cooked into chamber 105. A heating source 130 at the top of chamber 105 provides a heat source for cooking. Heating source 130 can be gas, electric, microwave, or a combination thereof. A bottom heating source 132 can be located at the bottom of chamber 105 as well. A rack 133 as shown in chamber 105 can be used to place food items at various levels within the cooking chamber for cooking. Rack 133 may be height adjustable and more than one such rack may be used in chamber 105. A window 110 on door 104 allows the user to view e.g., food items during the cooking process.

Oven 100 includes a user interface 102 having a display 103 positioned on a top panel 114 with a variety of controls 112. Interface 102 allows the user to select various options for the operation of oven 100 including e.g., temperature, time, and/or various cooking and cleaning cycles. Operation of oven appliance 100 can be regulated by a controller (not shown) that is operatively coupled i.e., in communication with, user interface panel 102, heating element 130, and other components of oven 100 as will be further described.

For example, in response to user manipulation of the user interface panel 102, the controller can operate heat sources 130 and/or 132. The controller can receive measurements from a temperature sensor 116 (further discussed below) and use the same to e.g., provide a temperature indication to the user with display 103. The controller can also be provided with other features as will be further described herein.

By way of example, the controller may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout appliance 100. In the illustrated embodiment, the controller may be located under or next to the user interface 102 otherwise within top panel 114. In such an embodiment, input/output ("I/O") signals are routed between the controller and various operational components of appliance 100 such heat source(s) 130 and/or 132, controls 112, display 103, sensor(s), alarms, and/or other components as may be provided. In one embodiment, the user interface panel 102 may represent a general purpose I/O ("GPIO") device or functional block.

Although shown with touch type controls 112, it should be understood that controls 112 and the configuration of appliance 100 shown in FIG. 1 is provided by way of example only. More specifically, user interface 102 may include various input components, such as one or more of a variety of electrical, mechanical or electro-mechanical input devices including rotary dials, push buttons, and touch pads. The user interface 102 may include other display components, such as a digital or analog display device designed to provide operational feedback to a user. The user interface 102 may be in communication with the controller via one or more signal lines or shared communication busses. Also, oven 100 is shown as a wall oven but the present invention could also be used with other appliances such as e.g., a stand-alone oven, an oven with a stove-top or range, and other configurations as well.

As stated, during operation of oven 100 in both cooking and cleaning cycles, the temperatures that are needed in chamber 105 can be high. Insulation in the top wall 118, bottom wall 120, as well as the vertically-oriented rear wall 124 and side walls 126 helps reduce heat transfer from oven 100 to e.g., surrounding cabinetry or ambient air. Door 104 is also provided with insulation as well. A gasket (not shown) between door 104 and walls 118, 120, and 126 provides thermal insulation but also allows a certain amount of ambient air to be drawn into oven chamber 105 during certain cooking operations as indicated by arrow BA.

Oven 100 is provided with a cooling system whereby ambient air is used to help cool appliance 100. More specifically, oven 100 includes a cooling air flow passageway 142 formed between walls 118, 120, 124, 126 and cabinet 122 of oven 100. Passageway 142 is shown schematically in the figures. As will be understood by one of skill in the art using the teachings disclosed herein, cooling air flow passageway 142 may have a variety of configurations other than as shown. In operation, a cooling fan 144 moves air through passageway 142 by drawing ambient air through an entrance 134 (arrow TA) positioned between door 104 and top panel 114. Fan 144 also pulls this cooler, ambient air through the electronics bay 162, which is connected with cooling air flow passageway 142. The flow of air through passageway 142 is indicated by arrows C in FIG. 2. After flowing past walls 118, 120, 124, and/or 126 to provide convective cooling, the air exits passageway 142 through cooling air flow exit 108.

Fan 144 also pulls air from oven chamber 105 through channel 146, which is typically a round, small diameter port located in the top wall 118 of the cooking chamber 105. The air withdrawn from chamber 105 is replaced by ambient air drawn into chamber 105 through the gasket (not shown) between door 104 and cabinet 122 as indicated by arrow BA. Such ventilation of chamber 105 helps to remove e.g., moisture and gases released during cooking operations.

Along rear wall 124, an oven air sampling channel 166 is provided in which temperature sensor 116 is located. For example, oven air sampling channel 166 could be configured as a pathway behind a portion 164 of rear wall 124. Oven air sampling channel 166 could also be configured as a chute or conduit within rear wall 124. In still other embodiments, channel 166 could be located interior of wall 124 and within cooking chamber 105. Channel 166 could also be located over top wall 118 or outside of opposing sidewalls 126. A variety of configurations may be used provided a channel is created for the flow of air from oven chamber 105 and temperature sensor 116 can be located in the channel. Oven air sampling channel 166 includes an oven air inlet 136 for the flow of air from within cooking chamber 105 into channel 166. Outlet 138 provides for the flow of air from channel 166 back into oven chamber 105. Although shown behind rear wall 124, oven air sampling channel 166 could also be positioned within the oven chamber along either of the opposing side walls 126 or rear wall 124 in other embodiments of the invention.

A secondary fan 128 is also configured for causing air to flow from cooking chamber 105 (arrow I) and through oven air sampling channel 166. For the exemplary embodiment of FIG. 2, fan 126 is shown located within air flow channel 166 just before exit 138 and downstream (in terms of the air flow in channel 166) from temperature sensor 116. However, other locations and configurations for fan 126 may be used as well, including upstream of the temperature sensor 116.

During cooking operations in chamber 105, fan 128 is operated to draw air from chamber 105 (arrow I) into oven air sampling channel 166. The temperature of this air flow from chamber 105 is measured by temperature sensor 116 and can be e.g., indicated by display 103 and/or provided to a controller for operating heat source(s) 130 and/or 132 so as maintain a desired temperature. The air then exits channel 166 as shown by arrow O. Fan 128 can be operated continuously during cooking operations. Alternatively, fan 128 may be operated intermittently according to e.g., an algorithm for taking temperature measurements using sensor 116.

As shown in FIG. 2, the inlet 136 to oven air sampling channel 166 is positioned near the vertical center VCL of oven 100. In alternative embodiments, inlet 136 can be located e.g., directly at vertical center VCL. By positioning the inlet 136 to oven air sampling channel 166 at or near vertical center VCL, a more accurate temperature measurement can be provided since this location is not adjacent to either heat source 130 or 132 nor is it located near the top of the oven where hotter, less dense air may be found. Instead, by locating inlet 136 as shown, the temperature of the air that is measured will more accurately reflect the temperature of the air near the food load placed into chamber 105 on e.g., rack 133.

In addition, by placing temperature sensor 116 inside air sampling channel 166, sensor 116 is shielded—at least in part—from radiant energy created by heat source(s) 130 and/or 132 that can provide inaccuracies in temperature measurement. To further delimit the effect of radiant energy, temperature sensor 116 can be shielded with e.g., a radiant energy shield, baffling, diffuser, coating, or the like. Additionally, air flow channel 166 may be provided with a low emissivity interior surface 148 to further decrease the effect of radiant energy on temperature sensor 116.

FIG. 3 illustrates a cross-sectional view of another exemplary embodiment of oven 100. For this exemplary embodiment, a fan 150 driven by motor 160 is located rear wall 124. Fan 150 may be the same fan that is used during convection cooking to provide for the flow of air within oven chamber 105. For example, fan 150 may be a radial type fan drawing oven air into oven air inlets 136 (arrows I), through oven air sampling channel 166, and out of outlets 138 (arrows O). Air drawn into oven air sampling channel 166 (arrows I) is also drawn past temperature sensor 116. Because air inlets 136 are positioned above and below the vertical center VCL of oven 100 while temperature sensor 116 is protected within air flow channel 166 as shown, improved accuracy in temperature measurements can be provided as previously described. It should be noted that in the case of using the oven's convection cooking fan/housing care needs to be taken to shield the sensor 116 from the IR radiation from the convection heat source (typically an electric heating element), and the sensor needs to be located upstream from said heat source.

An additional exemplary embodiment of oven 100 is illustrated in the cross-sectional view provided by FIG. 4. As with previous embodiments, an oven air sampling channel 166 is provided along a wall of oven chamber 105, and a temperature sensor 116 is located upstream of fan 128 that is used to pull oven air through channel 166. For this embodiment, however, oven air sampling channel 166 includes a cooling air flow inlet 158 created by e.g., a scoop 156. As such, a portion of the relatively cooler air flowing through cooling air flow channel 142 is drawn into oven air sampling channel 166 (arrow P) and mixes with air from the oven chamber in an air mixing zone 160 downstream of temperature sensor 116. Other configurations for cooling air flow inlet 158 may be used instead of scoop 156. For example, a port could be positioned on rear wall 124 that provides for inlet 158. Additionally, a damper or other device could also be configured to control the amount of air flow into channel 166 though air flow inlet 158.

The exemplary embodiment of FIG. 4 includes two humidity sensors 152 and 154. More specifically, first humidity sensor 152 is positioned in cooling air flow passageway 142 at a position upstream from the cooling air flow inlet 158. Because first humidity sensor 152 is positioned within the cooling air flow passageway 142, sensor 152 is not subjected to the extreme temperatures of oven chamber 105. A second humidity sensor 154 is positioned within the oven air sampling channel 166 downstream of the cooling air flow inlet 158 and downstream of air mixing zone 160 where air from oven chamber 105 and air from the cooling passageway 142 meet, and therefore measures the humidity of the mixed air. By mixing with the cooler air from passageway 142, the temperature of the air from oven chamber 105 is lowered so that second humidity sensor 154 is also not subjected to the extreme temperatures of oven chamber 105. A second temperature sensor (not shown) could also be located with first humidity sensor 152 at a position upstream from the cooling airflow inlet 158 to assist with determining the humidity of the cooling air.

Furthermore, by knowing the humidity of the air provided from the cooling air flow passageway as measured by the first humidity sensor 152, the measurement of humidity provided by second humidity sensor 154 can be used to determine the humidity inside oven chamber 105. Information regarding the humidity in chamber 105 can be useful during cooking operations to determine, e.g., the whether food is properly cooking.

Although temperature and/or humidity sensors are used for the exemplary embodiments shown in the figures, other types of sensors could be used instead or in addition thereto. These sensors can be of a variety of types, designed to measure a quantity or characteristic of the air, such as e.g. humidity, density, chemical composition, pH, a chemical compound sensor (e.g. VOCs, alcohols, keytones, oxygen, propane, methane, etc.), aroma/scent, smoke, dust, grease/oil droplets, and others as well.

Regardless, the exemplary embodiment of FIG. 4 provides for the use of such sensors without subjecting the same to the convective and radiant heat energy of chamber 105. As such, the present invention can enable the use of sensors that might not otherwise be possible due to the extreme temperatures in chamber 105.

FIG. 5 illustrates another exemplary embodiment of the present invention similar to the exemplary embodiment of FIG. 4 except fan 128 is not positioned in oven air sampling channel 166. Instead, this exemplary embodiment relies upon the movement of air provided by fan 144 to cause air from cooling air flow passageway 142 to travel into oven air sampling channel 166. This flow in turn entrains air already in channel 166 so as to cause of a flow air that draws in air from the oven chamber as shown by arrow I.

FIG. 6 illustrates another exemplary embodiment of the present invention similar to the exemplary embodiment of FIG. 4 except for this exemplary embodiment the outlet from oven air sampling channel 166 is directed into cooling air flow passageway 142, rather than back into the oven cavity. Additionally, fan 144 is not positioned near the electronic bay 162 and fan 128 is not positioned in oven air flow channel 166. Instead, fan 128 is positioned in passageway 142 downstream of the oven air sampling channel outlet 138, the fan now providing the dual functionality of appliance cooling and oven air sampling. As such, fan 128 draws air through air flow passageway 142 so as to provide the cooling air flow as shown by arrows C. It should be understood, however, that the exemplary embodiment of FIG. 6 can operate with a cooling fan located either upstream or downstream of cooling air intake 158. Additionally, scoop 156 provides for a flow of air into oven air sampling channel 166 through cooling air flow inlet 158 so as to provide for a flow of air from oven chamber 105 through channel 166 for temperature measurement as previously described. Again, cooler air is provided for sensors 152 and 154. In this arrangement, since oven cavity air is being exhausted to the ambient through the cooling airflow system, the traditional oven ceiling vent port 146 may be eliminated or reduced in size.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance, comprising:
    a cooking chamber for receipt of a food for cooking, said cooking chamber defined in part by at least one vertically-oriented wall,
    an oven air sampling channel comprising an oven air inlet for the flow of air from within said cooking chamber into said air sampling channel and an outlet for the flow of air out of said oven air sampling channel, wherein said oven air inlet is positioned along said at least one vertically-oriented wall,
    a sensor for measuring one or more properties of the air flowing through said oven air sampling channel;
    a fan configured for causing air to flow from said cooking chamber and through said oven air sampling channel;
    a cooling air flow passageway positioned exterior of said chamber and configured to providing cooling of the oven appliance during cooking operations, wherein said oven air sampling channel further comprises a cooling air inlet for providing air into said oven air sampling channel from said cooling air passageway, and wherein said sensor is positioned within said oven air sampling channel at a position upstream of said cooling air inlet; and
    an additional sensor positioned within said oven air sampling channel at a position downstream of said cooling air inlet.

2. An oven appliance as in claim 1, wherein said sensor comprises a temperature sensor for measuring the temperature of the air in said oven air sampling channel.

3. An oven appliance as in claim 2, wherein said oven air sampling channel comprises a low-emissivity interior surface in the vicinity of said temperature sensor.

4. An oven appliance as in claim 1, the cooking chamber having a vertical center equidistant from a top wall and a bottom wall of said cooking chamber, wherein the oven air inlet of the oven air sampling channel is positioned above the vertical center of said cooking chamber and the outlet is positioned below the vertical center of said cooking chamber.

5. An oven appliance as in claim 1, where said cooking chamber has a vertical center equidistant from the top and bottom walls of the cavity, wherein the oven air inlet of the air sampling channel is positioned proximate to the vertical center of said at least one vertically-oriented wall of said cooking chamber.

6. An oven appliance as in claim 1, wherein said sensor comprises a temperature sensor for measuring the temperature of the air in said oven air sampling channel, and wherein the fan is positioned at least partially within said oven air sampling channel and said temperature sensor is positioned upstream of said fan.

7. An oven appliance as in claim 1, wherein said additional sensor comprises a humidity sensor.

8. An oven appliance as in claim 1, wherein said sensor comprises a temperature sensor positioned within said oven air sampling channel at a position upstream of said cooling air inlet, and further comprising:
    a first humidity sensor positioned in said cooling air flow passageway; and
    a second sensor position in said oven air sampling channel at a position downstream from the cooling air inlet of said oven air flow channel.

9. An oven appliance, comprising:
    a cooking chamber configured for the receipt of food for cooking, the cooking chamber defined by a top wall, a bottom wall, and at least one vertically-oriented wall,
    a cooling air flow passageway positioned exterior of said cooking chamber and configured for providing cooling of the appliance;

a cooling fan in communication with said cooling air flow passageway and configured for moving an air flow comprising ambient air through said cooling air flow passageway;

an oven air sampling channel comprising
- an oven air inlet for the ingress of air from said cooking chamber into said oven air sampling channel, the oven air inlet positioned along at least one of the walls defining said cooking chamber;
- a cooling air inlet for ingress of air from said cooling air flow passageway into said oven air sampling channel;
- an outlet for the flow of air out of said oven air sampling channel;
- an air mixing zone within said air sampling channel, in fluid communication with the oven air inlet, cooling air inlet, and outlet, wherein the air streams from the oven inlet and the cooling air inlet become mixed;

a first sensor positioned downstream from said air mixing zone and configured for measuring one or more properties of air provided from said air mixing zone;

a second sensor positioned in said cooling air flow passageway, for the purpose of providing a reference measurement; and a third sensor positioned in said oven air flow channel at a position upstream from the air mixing zone of said oven air sampling channel.

10. An oven appliance as in claim 9, wherein said oven air sampling channel is positioned exterior of said cooking chamber.

11. An oven appliance as in claim 9, wherein said first sensor comprises a humidity sensor.

12. An oven appliance as in claim 11, wherein said oven air sampling channel comprises a low-emissivity interior surface in the vicinity of said temperature sensor.

13. An oven appliance as in claim 9, further comprising:
an additional fan configured for causing air to flow from said cooking chamber and through said oven air sampling channel.

* * * * *